(12) United States Patent  (10) Patent No.: US 9,212,580 B2
Lampen et al.  (45) Date of Patent: Dec. 15, 2015

(54) METHOD AND DEVICE FOR DETERMINING A STARTING TIME OF A REGENERATION PROCESS FOR REGENERATING A DIESEL PARTICLE FILTER

(71) Applicant: MANN+HUMMEL GMBH, Ludwigsburg (DE)

(72) Inventors: Ulrich Lampen, Bad Homburg (DE); Andreas Kloss, Mannheim (DE); Volker Hensel, Heidelberg (DE); Uwe Brenneis, Hockenheim (DE); Alexander Kuehn, Roemerberg (DE); Stéphane Nataf, Levallois-Perret (FR)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/027,465

(22) Filed: Sep. 16, 2013

(65) Prior Publication Data

US 2014/0230409 A1 Aug. 21, 2014

Related U.S. Application Data

(63) Continuation of application No. PCT/EP2012/054452, filed on Mar. 14, 2012.

(30) Foreign Application Priority Data

Mar. 15, 2011 (DE) .......................... 10 2011 014 129

(51) Int. Cl.
*F01N 3/00* (2006.01)
*F01N 3/10* (2006.01)
(Continued)

(52) U.S. Cl.
CPC ................ *F01N 3/023* (2013.01); *F01N 3/027* (2013.01); *F01N 9/002* (2013.01); *F01N 11/002* (2013.01);
(Continued)

(58) Field of Classification Search
CPC ......... F01N 3/023; F01N 3/027; F01N 9/002; F01N 11/002; F01N 2550/04; F01N 2900/0412; F01N 2900/1404; F01N 2900/1406; F01N 2900/1411; F02D 41/029; F02D 41/2451; F02D 41/1446; F02D 41/18; F02D 2200/0812; Y02T 10/47; Y10T 29/49231
USPC .......... 60/274, 286, 295, 303, 311; 29/888.01
See application file for complete search history.

(56) References Cited

U.S. PATENT DOCUMENTS

2003/0230075 A1  12/2003  Saito et al.
2008/0307776 A1  12/2008  Gonze
2012/0073270 A1*  3/2012  Cox et al. .......................... 60/287

FOREIGN PATENT DOCUMENTS

DE  102005010785 A1 *  9/2006  .............. F02D 41/18
DE  102008050019 A1   6/2009
(Continued)

OTHER PUBLICATIONS

PCT search report of PCT/EP2012/054452, dated Aug. 14, 2012.

*Primary Examiner* — Audrey K Bradley
(74) *Attorney, Agent, or Firm* — James Hasselbeck

(57) ABSTRACT

Method for determining a starting time of a regeneration process of a particle filter which is connected into the exhaust train of an internal combustion engine, in particular of a diesel engine, wherein the data of an air mass flow rate meter, of an exhaust gas temperature sensor and of a differential pressure sensor are fed to a control unit and the control unit starts the regeneration on the basis of the data by means of the comparison with characteristic diagrams.

6 Claims, 2 Drawing Sheets

(51) Int. Cl.
*F01N 3/02* (2006.01)
*F01N 3/023* (2006.01)
*F01N 3/027* (2006.01)
*F01N 9/00* (2006.01)
*F01N 11/00* (2006.01)
*F02D 41/02* (2006.01)
*F02D 41/24* (2006.01)
*F02D 41/14* (2006.01)
*F02D 41/18* (2006.01)

(52) U.S. Cl.
CPC .......... *F02D 41/029* (2013.01); *F02D 41/2451* (2013.01); *F01N 2550/04* (2013.01); *F01N 2900/0412* (2013.01); *F01N 2900/1404* (2013.01); *F01N 2900/1406* (2013.01); *F01N 2900/1411* (2013.01); *F02D 41/1446* (2013.01); *F02D 41/18* (2013.01); *F02D 2200/0812* (2013.01); *Y02T 10/47* (2013.01); *Y10T 29/49231* (2015.01)

(56) References Cited

FOREIGN PATENT DOCUMENTS

| EP | 1092847 | A2 | | 4/2001 | |
|---|---|---|---|---|---|
| EP | 1170473 | A1 | * | 1/2002 | ................ F01N 9/00 |
| WO | 03100244 | A1 | | 12/2003 | |

* cited by examiner

METHOD AND DEVICE FOR DETERMINING A STARTING TIME OF A REGENERATION PROCESS FOR REGENERATING A DIESEL PARTICLE FILTER

CROSS-REFERENCE TO RELATED APPLICATIONS

This application is a continuation application of international application No. PCT/EP2012/054452 having an international filing date of Mar. 14, 2012 and designating the United States of America, the international application claiming a priority date of Mar. 15, 2011, based on prior filed German patent application No. 10 2011 014 129.4, the entire contents of the aforesaid international application and the aforesaid German patent application being incorporated herein by reference.

TECHNICAL FIELD

The invention relates to a method and a device for determining a starting time of a regeneration process of a particle filter connected into the exhaust train of an internal combustion engine, in particular of a diesel engine. The invention relates to a system for particle filtration for an internal combustion engine, in particular a diesel engine. Moreover, the invention relates to a method for retrofitting an internal combustion engine, in particular a diesel engine, with a system for particle filtration.

PRIOR ART

As is known from DE 10 2006 033 567 A1, particle filters are connected into the exhaust train of diesel engines to reduce the particle emission, in particular a soot emission. When operating a diesel engine, particles collect on the filter surface of the particle filter or in the filter medium thereof. Eliminating the soot by means of a soot burn-off and therefore by oxidation is known for regenerating such a particle filter. This type of soot burn-off occurs automatically when the exhaust gas temperature flowing against the particle filter is greater than the ignition temperature of the soot. Fuel additives can be used to reduce the soot ignition temperature. Thus, an ignition can also take place by adding these types of additives at a temperature below the soot ignition temperature, but above the soot ignition temperature with additives. The exhaust gas temperature then normally exceeds the soot ignition temperature or said soot ignition temperature with the addition of additives if the diesel engine is operating under a specific load over a specific time period. Active regeneration processes are used in order to make a regeneration of the particle filter possible also in operating states in which the exhaust gas temperature is lower than the soot ignition temperature also with the addition of additives. This is accomplished by supplying thermal energy, for instance via thermoelectric heating elements or by injecting fuel into the exhaust gas stream.

To make it possible for a discontinuous regeneration of the particle filter to occur through soot burn-off, it is necessary for the particle filter to have a specific soot load or to not exceed said load. If the soot quantity accumulated on the particle filter is too low, this can lead to an incomplete, uneven soot burn-off, and if the soot quantity is too great, uncontrolled combustion processes and therefore damage may occur. Therefore, the point in time at which regeneration is started is essential for the regulation of a particle filter system. If this takes place too soon, e.g., too frequently, there is not enough material (soot) on the filter for regeneration to proceed completely, in other words, for the entire filter to be cleaned. For the filter elements used, there are, e.g., sintered metal filters or even ceramic filter elements, e.g., based on silicon carbide, cordierite or aluminum titanate, and an upper and lower limit for the soot load between which a regeneration takes place optimally. As a result, the soot load must be observed and as soon as the application is in the optimal "soot window", a suitable point in time must be determined for igniting the regeneration.

Patent EP1509691 B1 describes the start of a regeneration as a function of the soot load on the filter. The pressure difference in the exhaust gas after-treatment system before and after the particle filter is determined as an essential parameter. In addition, a theoretic particle load is calculated and the load state of the particle filter is determined by comparing the theoretic particle load with the particle load measured from the pressure difference, wherein to calculate the theoretic particle load, the exhaust gas temperature minus an assessment threshold is integrated over a predetermined time.

Patent EP1583892 B1 describes a method for regulating the actuation of a heating apparatus for regenerating a particle filter connected into the exhaust train of an internal combustion engine. In the case of this method, the exhaust gas backpressure generated by the particle filter is detected as a measure of the soot load state of the particle filter and the exhaust gas backpressure is measured when the engine is idling and the exhaust gas recirculation is switched off. Then the exhaust gas backpressure signal is compared with a threshold value representing an adequate soot load for triggering a regeneration of the particle filter. The heating apparatus for triggering the regeneration process is enabled when the detected exhaust gas backpressure signal is greater than the threshold value. The disadvantage here is that the exhaust gas backpressure cannot be measured during ongoing normal operation, but only when idling.

An at least two-stage method for determining the starting time of the regeneration process of a particle filter connected into the exhaust train of an internal combustion engine is known from patent DE 102006033567 A1 that was already cited above. In this case, first the current soot load state of the particle filter is determined. Said soot load state is compared with a characteristic diagram constructed of data which represent the soot load required for a regeneration process with adequate regeneration success in the case of different operating states of the internal combustion engine. If the currently determined soot load is greater than or equal to the minimum soot load required by the characteristic diagram, a "load state OK" flag is set. Once the "load state OK" flag is set, the expected regeneration success for it is determined, if the regeneration process would be triggered at the point in time of the determination as a function of the current operating state of the internal combustion engine. If this regeneration success is adequate, a "start regeneration" flag is set.

A method is known from patent application EP 2252780 for determining the load state of a particle filter connected into the exhaust train of an internal combustion engine, in particular of a diesel engine, which comprises the following steps: determining the exhaust gas volume flow in the flow direction of the exhaust gas after the particle filter; detecting the prevailing pressure in the exhaust train in the flow direction of the exhaust gas before the particle filter; comparing the exhaust gas volume flow determined in the flow direction after the particle filter with the prevailing pressure determined before the particle filter; and evaluating the result of the comparison taking into consideration the exhaust gas backpressure made available by the unloaded particle filter with respect to the exhaust gas backpressure producing the particle filter load.

DISCLOSURE OF THE INVENTION

The invention discloses a method for determining a starting time of a regeneration process of a particle filter connected into the exhaust train of an internal combustion engine, in particular of a diesel engine, wherein the data of an air mass flow rate meter, of an exhaust gas temperature sensor and of a differential pressure sensor are fed to a control unit and this control unit starts the regeneration on the basis of the data by comparing the data with characteristic diagrams. In the case of a characteristic diagram, a mass air flow is preferably allocated a value of a load state of the particle filter, starting at which mass air flow can be regenerated. A value of the load state is preferably allocated to a combination of mass air flow, exhaust gas temperature and differential pressure.

In the case of the method, the engine operation can be detected via the mass air flow signal. A signal from the engine about the rpm of the engine is not required for this.

In the case of the present invention, the method for determining a starting time of a regeneration process of a particle filter connected into the exhaust train of an internal combustion engine, in particular of a diesel engine, utilizes the values of three sensors: the exhaust gas temperature sensor, air mass flow rate meter and differential pressure sensor, and three characteristic diagrams of exhaust gas temperature, mass air flow and differential pressure, which were recorded with an unloaded, partially loaded and maximally loaded filter and between which can be interpolated. The soot load on the filter is determined continuously. The measured sensor data are permanently correlated in the software and checked to see whether the regeneration can start.

An exhaust gas temperature sensor upstream from the particle filter is preferably exclusively used during measurement. This reduces the complexity of the system, which is important for retrofitting solutions in particular The invention provides for a continuous monitoring of the relevant parameters, which have been permanently correlated with each other. When the overall picture of all monitored parameters permits a regeneration to be triggered, the regeneration process of the particle filter is started. Therefore, this does not constitute a static monitoring, in which first a flag is set and when said flag is set, additional parameters are checked, but a dynamic regulation or control.

One advantage is the permanent monitoring of the parameters that are essential for regeneration and the assessment of the overall situation. Every value is not evaluated individually and compared with an associated value which must be achieved, rather all parameters are permanently checked and correlated with each other and the interaction of all values is checked. As a result, a clearly higher level of flexibility is achieved, when it is a matter of making a decision about the start of regeneration.

The current state of the engine (idling, full load, switched off, etc.) is also important for starting a regeneration. The signal of the air mass flow rate meter is evaluated to determine the operating states of the engine. When the sensor is installed in the machine, it is adapted to the vehicle (idling signal and signal with the highest possible load and rpm) or specified in the control unit. Therefore, the software is able to determine a suitable engine state for regeneration. For example, the value for the load taken from the interpolated characteristic diagrams, which correspond to the measured values of exhaust gas temperature, mass air flow and differential pressure, can be compared to a value, which allocates a lower threshold value for the load to a characteristic diagram of the mass air flow. Regeneration is started once the value taken for the load is greater than the threshold value for the load.

The invention provides for a direct measurement of the mass air flow, in particular in the intake tract of the internal combustion engine. Therefore, the method and the device for determining a starting time of a regeneration process of a particle filter connected into the exhaust train of an internal combustion engine are independent of the rpm/mass air flow ratio and can easily be adapted to a vehicle. This is a substantial improvement for use in retrofitting applications and original equipment applications, in particular in the case of a high level of variant diversity, i.e., when a system is supposed to be able to be utilized with as few modifications as possible in different vehicles, such as e.g., construction vehicles, industrial trucks, etc. Therefore, the invention does not use the rpm signal, but the air mass flow rate meter to detect a favorable point in time for starting regeneration.

In one embodiment, characteristic diagrams for the relationship between the exhaust gas temperature, mass air flow and differential pressure in the three load states of no load, lower threshold for regeneration and upper threshold for regeneration, are stored for a diesel particle filter as a function of its geometry and size. No information about the internal combustion engine is required for this data.

In a preferred embodiment for the respective particle filter, values or curves are provided for the exhaust gas backpressure as a function of the exhaust gas volume flow for three states. The first state is without a load (0 $g/m^2$). The second state is for a load (for example a value in the range of 18-28 $g/m^2$, in particular 20-26 $g/m^2$, preferably 24 $g/m^2$) starting at which a regeneration can be conducted meaningfully. This is in particular the smallest load at which the any soot located in the particle filter burns off completely, after an ignition has taken place in a region of the particle filter.

Ignition can be accomplished for example by after-injecting fuel and therefore increasing the exhaust gas temperature or by providing an energy source, especially an electric one, locally on the particle filter. Electric ignition is possible for example by means of a central glow plug or a radially circumferential heater and takes place preferably on the upstream end of the particle filter, for example circumferentially on the outer edge or centrally in the center of the particle filter.

The third state is a load (for example a value in the range of 28-42 $g/m^2$, in particular 30-38 $g/m^2$, preferably 36 $g/m^2$) starting at which regeneration should no longer be carried out in order to keep from endangering the diesel particle filter from too high a temperature during regeneration.

Adapted to the internal combustion engine, the relationship between the mass air flow and load is determined in a preferred embodiment. To this end, the mass air flow is measured during idling and the mass air flow is measured at full load. This can be conducted once for an internal combustion engine type and be stored in the control unit or be performed on the special internal combustion engine when an internal combustion engine is being retrofitted with a diesel particle filter system with regeneration.

In one embodiment, the mass air flow range between idling and full load is then subdivided into a number ranges, e.g., into three or four ranges. These ranges are preferably distributed uniformly over the mass air flow range between idling and full load. The range between the lower and upper threshold for the regeneration is correspondingly subdivided into many parts, which are allocated to the ranges of the mass air flow range. In the process, the range of the smallest load is allocated to the range with the greatest mass air flow rate and vice versa. As a result, a load value of the diesel particle filter starting at which a regeneration can take place is then allocated to a load of the internal combustion engine via the mass air flow in the case of this load. At full load or high mass air flow, the regeneration also promises to be successful at low loads. In other words, a high mass air flow rate is required at low loads for successful regeneration. In the case of higher loads, regeneration is already possible at lower mass air flows, wherein in the range of the highest load, a regeneration also takes place during idling, i.e., with the lowest mass air flow rate. The allocation can be made such that a minimum value is provided as the lower regeneration threshold for the mass air flow for each partial range of the load starting at which regeneration is possible, wherein, in the range of the lowest load, a mass air flow rate in the highest range is required. In this case, the maximum mass air flow determined at full load is always used as the upper regeneration threshold for the mass air flow. Alternatively, a fixed allocation of ranges of the load to ranges of the mass air flow is provided so that regeneration only takes place at high load, if the load, i.e., the mass air flow moves in the lowermost range and vice versa. In this case, the minimum mass air flow, i.e., during idling, represents the lower regeneration threshold of the mass air flow for the range of the highest load, and the upper limit of the first range of the mass air flow above idling represents the upper regeneration threshold of the mass air flow for a range of the highest load.

The method for determining the start of regeneration may be carried out in particular by the control unit evaluating the data of the exhaust gas temperature sensor, of the air mass flow rate meter and of the differential pressure sensor. When the load value from the characteristic diagrams is in the range between the lower regeneration threshold and the upper regeneration threshold, a check is preferably performed to see whether the currently measured mass air flow rate is in the range, which was allocated to the load range as described, in which the currently established load value is located. If this is the case, regeneration is started. It is understood that mean values over e.g., 5 sec. can always also be used for the individual values of the sensors.

The invention also includes a device for determining a starting time of a regeneration process and for regeneration of a particle filter connected into the exhaust train of an internal combustion engine, in particular of a diesel engine, comprising an air mass flow rate meter, which is arranged in terms of flow in the intake air stream before the particle filter, in particular between the intake air filter and engine, an exhaust gas temperature sensor before the particle filter of a differential pressure sensor unit, which determines the pressure difference before and after the particle filter, a control unit, which comprises data connections for the data relating to mass air flow, exhaust gas temperature, differential pressure and maintenance. The device also preferably comprises power electronics, which are separate from the control unit, for regulating the heat source for the particle filter, which power electronics can be activated by the control unit. By separating the power electronics and the control unit, it is possible to reduce the influence of the control unit that stems from high energy for the heat source, e.g., from the high temperature generated in the process. To detect the temperature, preferably only the exhaust gas temperature sensor is provided before the particle filter. This reduces the complexity of the system, which is of significance for retrofitting solutions in particular.

In one embodiment, the power electronics comprise a monitoring unit for the current flow and the monitoring unit can report the current flow back to the control unit. This makes it possible to ensure that the regeneration process has really started. This is important e.g., in a fault analysis.

One advantage of the invention is the independent nature of the application and thus the applicability for retrofitting applications and original equipment applications, in particular in the case of a high level of variant diversity. The system can be installed independent of knowledge about the engine and obtains the only essential information (mass air flow signal during idling and at high load) during installation.

A routine is preferably run through during installation, during which the control unit learns two or more mass air flow signals specifically for the application. One value is e.g., the idling signal and a second value is at the highest possible rpm and load without a precise value being specified in the process. The gradient determined here in the mass air flow signal subsequently permits a rough estimate of the current load state. Knowledge of the load state is a crucial aid in deciding whether or not it is a favorable point in time for a regeneration. In this case, the prior art provides for an rpm measurement which is not learned as a function of the vehicle. The rpm is provides very inadequate information about the load state of an engine especially in the case of turbocharged engines.

The result of the aforementioned advantage is that the cable for the rpm signal does not need to be attached.

The differential pressure sensor unit can also be constructed of two pressure sensors, from which a differential pressure is determined in the control unit.

To optimize the regeneration, it is furthermore possible for an additive metering system to be provided in a design of the method and devices and systems according to the invention. This preferably comprises an additive tank and a metering pump for the additive, which is able to meter the additive for example into the fuel return line such that the additive reaches the fuel tank and can be conveyed to the diesel engine together with the fuel via the fuel supply line. A module with a filling level sensor and/or filling level display can be provided for the filling level of the fuel tank. An additive that facilitates the regeneration of the diesel particle filter is advantageously used. This may be a catalytic solution, for example, i.e., metal-based, in particular containing iron, iron compounds such as Fe2O3, platinum or other metal catalysts.

EMBODIMENT(S) OF THE INVENTION

Figure 1:
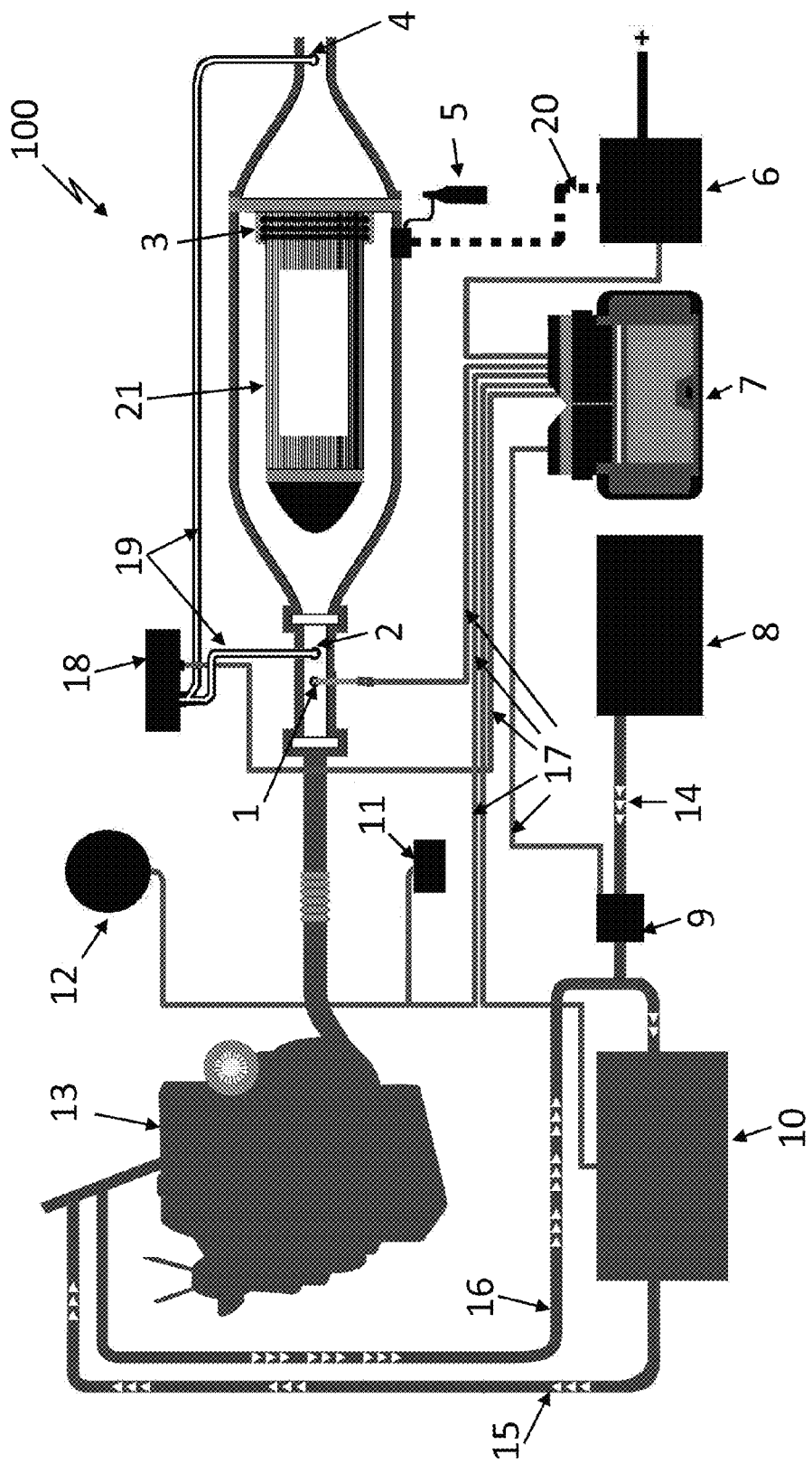
FIG. 1 depicts a diesel particle filter system having the components of a regeneration system and FIG. 2 shows an example of a load characteristic diagram of a diesel particle filter.

FIG. 1 depicts a typical diesel particle filter system 100. The positions 2 and 4 show pressure measuring points before and after the diesel particle filter. The differential pressure sensor 18 is connected to the pressure measuring points 2, 4 via differential pressure measurement lines 19. The pressure drop over the diesel particle filter 21 can be determined at the pressure measuring points. The depicted diesel particle filter 21 is a sintered metal filter; other filter element technologies are likewise possible, e.g., ceramic filter elements made of silicon carbide-based, aluminum titanate or cordierite-based ceramics. A heat source 3, e.g., a heater, is attached in or on the diesel particle filter. This can be a resistance heater. The heater 3 current is controlled or regulated by power electronics 6, in particular by a power relay. The power electronics 6 are designed to be separate from the electronic control unit 7 and are connected therewith via one of the control lines 17. The control unit 7 provides the current target value to the power electronics 6. The power electronics can comprise a monitoring unit, which reports the value of the current strength back to the control unit. The device for regeneration comprises a temperature sensor 1. This may be e.g., a thermal element. The temperature sensor 1 is connected to the control unit 7 via the control lines 17. An air mass flow rate meter 11 is likewise connected to the control unit 7 via a control line 17. Energy is supplied to the heater 3 via a power supply 20, and the heater 3 is also connected to the vehicle mass 5. Furthermore, an additive tank 8 and a metering pump 9 may be provided for the additive, which is able to meter the additive into the fuel return line 16 such that the additive reaches the fuel tank 10 and can be conveyed to the diesel engine 13 together with the fuel via the fuel supply line 15. A module 12 with a filling level sensor and/or filling level display can be provided for the filling level of the fuel tank. An additive that facilitates the regeneration of the diesel particle filter is advantageously used. This may be a catalytic solution, for example, i.e., metal-based, in particular containing iron, iron compounds such as Fe2O3, platinum or other metal catalysts.

Figure 2:
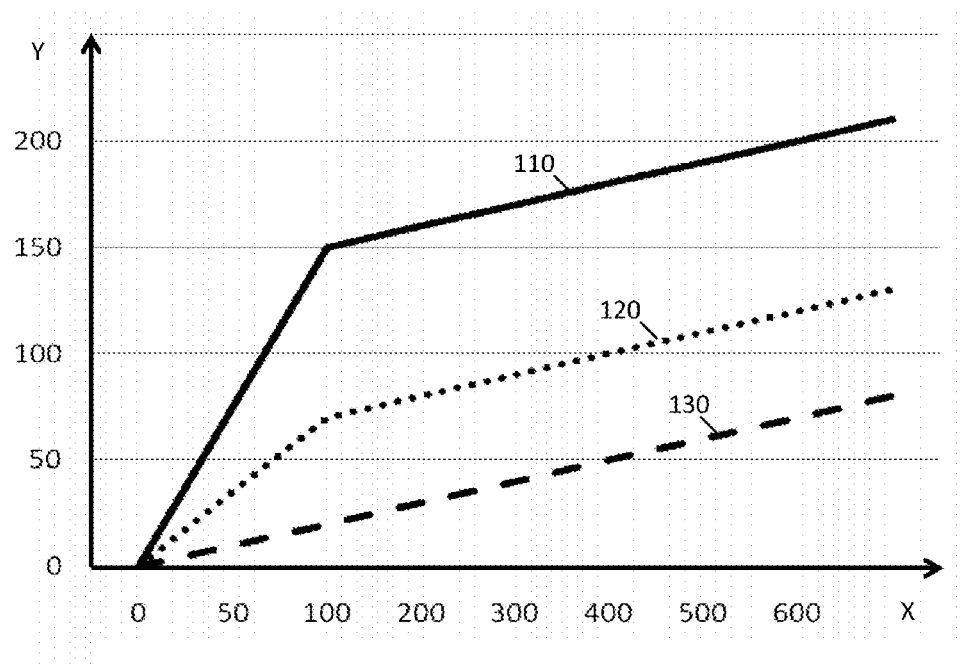

FIG. 2 provides an example of a load characteristic diagram for the diesel particle filter. The exhaust gas volume flow in m³/h is plotted on the x-axis, and the exhaust gas backpressure in mbar on the y-axis. Curves are shown for the exhaust gas backpressure as a function of the exhaust gas volume flow. The first curve 110 shows the condition for no load (0 g/m²), the second curve 120 for a load (here e.g., 24 g/m²) starting at which a regeneration can be conducted meaningfully, and the third curve 130 for a load (here e.g., 36 g/m²) starting at which regeneration should no longer be conducted in order to keep from endangering the diesel particle filter from too high a temperature during regeneration.

Characteristic diagrams for the relationship between the exhaust gas temperature, mass air flow and differential pressure in the three load states of no load, lower threshold for regeneration and upper threshold for regeneration, are stored for a diesel particle filter as a function of its geometry and size. No information about the internal combustion engine is required for these data.

Adapted to the internal combustion engine, the relationship between the mass air flow and load is determined. To this end, the mass air flow during idling is measured and the mass air flow at full load. This can be conducted once for an internal combustion engine type and be stored in the control unit or be performed on the special internal combustion engine when an internal combustion engine is being retrofitted with a diesel particle filter system with regeneration. The mass air flow range between idling and full load is then subdivided e.g., into three or four ranges. The range between the lower and upper threshold for the regeneration is correspondingly subdivided into many parts, which are allocated to the ranges of the mass air flow range. As a result, a load value of the diesel particle filter starting at which a regeneration can take place is then allocated to a load of the internal combustion engine via the mass air flow in the case of this load. At full load or high mass air flow, the regeneration also promises to be successful at low loads. During idling, a high load is required.

If the system has been prefabricated for particle filter separation, the method for determining the start of regeneration can be conducted in that the data of the exhaust gas temperature sensor, of the air mass flow rate meter and of the differential pressure sensor are evaluated by the control unit; and when the load value from the characteristic diagrams is in the range between the lower regeneration threshold and the upper regeneration threshold of the momentary mass air flow value, regeneration is started. It is understood that mean values over e.g., 5 sec. can always also be used for the individual values of the sensors.

The invention claimed is:

1. A device for determining a starting time of a regeneration process of a diesel particle filter which is connected into the exhaust train of an internal combustion engine, comprising:
   a. an air mass flow rate meter, which is arranged in terms of flow in an intake air stream before the particle filter, between an intake air filter and a turbocharger,
   b. an exhaust gas temperature sensor arranged before the particle filter,
   c. a differential pressure sensor, which determines the pressure difference before and after the particle filter, and
   d. an electronic controller, which to determine the start of regeneration only requires data connections for data relating to air mass flow, exhaust gas temperature and differential pressure, wherein the electronic controller is configured to perform the method of:
      providing three soot load thresholds of the particle filter based upon geometry and size of the particle filter, the soot load thresholds consisting of:
         an unloaded soot load threshold in g/m², representing a soot load of the particle filter with no soot in its filtration surface area and defining an unloaded state of the particle filter;
         a lower soot load threshold defining a lower threshold for regeneration state of the particle filter;
         wherein the lower soot load threshold is the smallest soot load in g/m² at which soot particles in the particle filter burn off completely during regeneration;
         an upper soot load regeneration threshold;
         wherein the upper soot load regeneration threshold is the soot load in g/m² above which regeneration is not to be carried out to prevent endangering the particle filter from too high a temperature during regeneration;
         wherein the three soot load limits are determined by geometry and size of the particle filter;
      providing characteristic values of the particle filter in the exhaust train of the internal combustion engine, including
         a first exhaust gas temperature characteristic value at the unloaded soot load condition of the particle filter;
         a second exhaust gas temperature characteristic value at the lower soot load threshold;
         a third exhaust gas temperature characteristic value at the upper soot load regeneration threshold of the particle filter;
         a first air mass flow characteristic value at the unloaded soot load condition of the particle filter;
         a second air mass flow characteristic value at the lower soot load threshold;
         a third air mass flow characteristic value at the upper soot load regeneration threshold of the particle filter;
         a first differential pressure characteristic value of pressure difference between the inlet and the outlet of the particle filter at the unloaded soot load condition of the particle filter;
         a second differential pressure characteristic value of pressure difference value between the inlet and the outlet of the particle filter at the lower soot load threshold; and a third differential pressure characteristic value of pressure difference value between the inlet and the outlet of the particle filter at the upper soot load regeneration threshold of the particle filter;

determining the operating load state of the particle filter by:
  determining a first operating load state as the load state from a measured exhaust gas temperature, wherein
    if the measured exhaust gas temperature<=first exhaust gas temperature state value then the first operating load state is unloaded;
    if first exhaust gas temperature state value<the measured exhaust gas temperature<second exhaust gas state value then the first operating load state is ready to regenerate;
    if third exhaust gas temperature state value<the measured exhaust gas temperature then the first operating load state is regeneration disabled;
  determining a second operating load state as the load state from a measured particle filter differential pressure, wherein
    if the measured differential pressure<=first differential pressure characteristic value then then second operating load state is unloaded;
    if the first differential pressure characteristic value<measured differential pressure<third differential pressure characteristic value then then second operating load state is ready to regenerate;
    if third differential pressure characteristic value<the measured differential pressure then the second operating load state is regeneration disabled;
  determining a third operating load state as the load state from the a measured air mass flow, wherein
    if the measured air mass flow<=first air mass flow characteristic value then the third operating load state is unloaded;
    if the first air mass flow characteristic value<measured air mass flow<third air mass flow characteristic value then then third operating load state is ready to regenerate;
    if third air mass flow state<the measured air mass flow then the third operating load state is regeneration disabled;
  determining the start time to regenerate from the operating load states, when at least one of the operating load states is ready to regenerate.

2. Device according to claim 1, wherein
the exhaust gas temperature sensor measures exhaust gas temperature upstream of the particle filter.

3. Device according to claim 1, comprising
power electronics, which are separate from the electronic controller, regulating the heat generated by a regeneration heat source activated by the control unit for the particle filter.

4. Device according to claim 3, wherein
the power electronics monitor current flow to the heat source and report the current flow back to the electronic controller.

5. A method of improving the functioning and regeneration of a diesel particle filter by determining a starting time of a regeneration process of the particle filter which is connected into the exhaust train of an internal combustion engine, comprising:

providing an air mass flow rate meter measuring air mass flow to the internal combustion engine and providing measured air mass flow rate data to an electronic controller;

providing an exhaust gas temperature sensor measuring temperature of exhaust gas from the internal combustion engine and providing measured exhaust gas temperature data to the electronic controller;

providing a differential pressure sensor measuring pressure difference between and inlet and outlet of the particle filter and providing measured differential pressure data to the electronic controller;

providing three soot load thresholds of the particle filter based upon geometry and size of the particle filter, the soot load thresholds consisting of:
  an unloaded soot load threshold in $g/m^2$, representing a soot load of the particle filter with no soot in its filtration surface area and defining an unloaded state of the particle filter;
  a lower soot load threshold defining a lower threshold for regeneration state of the particle filter;
  wherein the lower soot load threshold is the smallest soot load in $g/m^2$ at which soot particles in the particle filter burn off completely during regeneration;
  an upper soot load regeneration threshold;
  wherein the upper soot load regeneration threshold is the soot load in $g/m^2$ above which regeneration is not to be carried out to prevent endangering the particle filter from too high a temperature during regeneration;
  wherein the three soot load limits are determined by geometry and size of the particle filter alone;

providing characteristic values of the particle filter in the exhaust train of the internal combustion engine, including
  a first exhaust gas temperature characteristic value at the unloaded soot load condition of the particle filter;
  a second exhaust gas temperature characteristic value at the lower soot load threshold;
  a third exhaust gas temperature characteristic value at the upper soot load regeneration threshold of the particle filter;
  a first air mass flow characteristic value at the unloaded soot load condition of the particle filter;
  a second air mass flow characteristic value at the lower soot load threshold;
  a third air mass flow characteristic value at the upper soot load regeneration threshold of the particle filter;
  a first differential pressure characteristic value of pressure difference between the inlet and the outlet of the particle filter at the unloaded soot load condition of the particle filter;
  a second differential pressure characteristic value of pressure difference value between the inlet and the outlet of the particle filter at the lower soot load threshold; and
  a third differential pressure characteristic value of pressure difference value between the inlet and the outlet of the particle filter at the upper soot load regeneration threshold of the particle filter;

determining the operating load state of the particle filter by:
  determining a first operating load state as the load state from the measured exhaust gas temperature, wherein
    if the measured exhaust gas temperature<=first exhaust gas temperature state value then the first operating load state is unloaded;

if first exhaust gas temperature state value<the measured exhaust gas temperature<second exhaust gas state value then the first operating load state is ready to regenerate;

if third exhaust gas temperature state value<the measured exhaust gas temperature then the first operating load state is regeneration disabled;

determining a second operating load state as the load state from the measured differential pressure, wherein if the measured differential pressure<=first differential pressure characteristic value then then second operating load state is unloaded;

if the first differential pressure characteristic value<measured differential pressure<third differential pressure characteristic value then then second operating load state is ready to regenerate;

if third differential pressure characteristic value<the measured differential pressure then the second operating load state is regeneration disabled;

determining a third operating load state as the load state from the measured air mass flow, wherein if the measured air mass flow<=first air mass flow characteristic value then the third operating load state is unloaded;

if the first air mass flow characteristic value<measured air mass flow<third air mass flow characteristic value then then third operating load state is ready to regenerate;

if third air mass flow state<the measured air mass flow then the third operating load state is regeneration disabled;

determining the start time to regenerate from the operating load states, when at least one of the operating load states is ready to regenerate;

starting regeneration of the diesel particle filter by activating a heater in the diesel particle filter to burn off soot to regenerate the diesel particle filter.

6. Method according to claim 1, further comprising determining if the engine is in operation via the air mass flow signal.

* * * * *